(12) United States Patent
Kuri et al.

(10) Patent No.: US 10,866,100 B2
(45) Date of Patent: Dec. 15, 2020

(54) METHOD OF PROVIDING URBAN HIKING TRAILS

(71) Applicant: Kamino Labs, Inc., San Diego, CA (US)

(72) Inventors: Jorge Carlos Kuri, Houston, TX (US); Louis P. Huynh, San Diego, CA (US); Roger Obando, Los Angeles, CA (US)

(73) Assignee: Kamino Labs, Inc., Houston, TX (US)

( * ) Notice: Subject to any disclaimer, the term of this patent is extended or adjusted under 35 U.S.C. 154(b) by 120 days.

(21) Appl. No.: 13/839,007

(22) Filed: Mar. 15, 2013

(65) Prior Publication Data
US 2014/0108137 A1 Apr. 17, 2014

Related U.S. Application Data

(60) Provisional application No. 61/713,903, filed on Oct. 15, 2012.

(51) Int. Cl.
| | |
|---|---|
| *G06Q 30/02* | (2012.01) |
| *G01C 21/00* | (2006.01) |
| *G06Q 10/04* | (2012.01) |
| *G01C 21/20* | (2006.01) |

(52) U.S. Cl.
CPC .......... *G01C 21/00* (2013.01); *G01C 21/20* (2013.01); *G06Q 10/047* (2013.01); *G06Q 30/0259* (2013.01); *G06Q 30/0261* (2013.01)

(58) Field of Classification Search
USPC ............................................ 705/14.1–14.73
See application file for complete search history.

(56) References Cited

U.S. PATENT DOCUMENTS

| | | | |
|---|---|---|---|
| 2008/0306826 A1* | 12/2008 | Kramer | G06Q 30/02 705/14.14 |
| 2009/0157509 A1* | 6/2009 | Little et al. | 705/14 |
| 2012/0036467 A1* | 2/2012 | Tom | G06Q 10/047 715/772 |
| 2013/0179246 A1* | 7/2013 | Ross | 705/14.24 |

* cited by examiner

*Primary Examiner* — Peter H Choi
*Assistant Examiner* — Derek Jessen
(74) *Attorney, Agent, or Firm* — Alston & Bird LLP

(57) ABSTRACT

Methods, apparatuses, and computer program products are described herein that are configured to enable a user the ability to create, log, experience and share experiences, sites, editorial commentary, photographs, and videos along either newly created or already defines tours, routes, or hikes, which may be called "urban hiking trails" (i.e. walking tours within cities). Users can choose among different hikes with established sites to see, stops to make, and merchants to visit, along with historical or editorial content to provide information to the user along the route. Merchant partners are given the ability to provide focused targeted advertising to the users that have begun or are about to physically experience such walking tours.

10 Claims, 13 Drawing Sheets

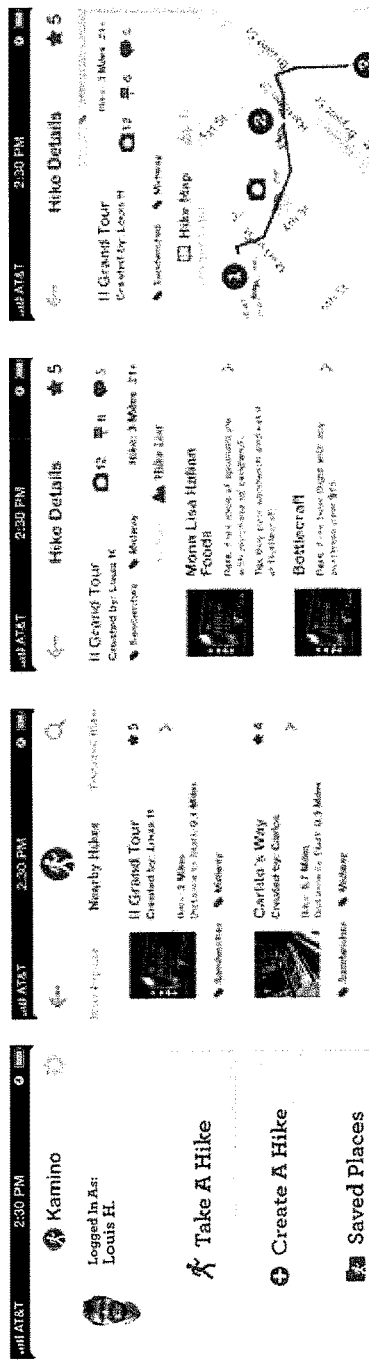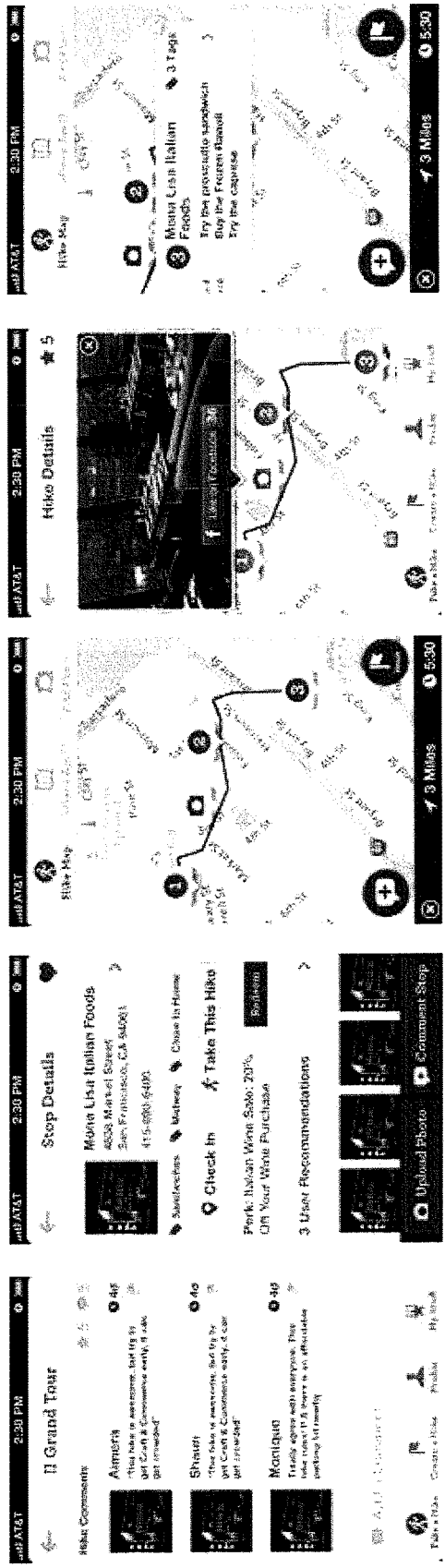
FIGURE 12
FIGURE 13
FIGURE 14
FIGURE 15
FIGURE 16
FIGURE 17
FIGURE 18
FIGURE 19
FIGURE 20
FIGURE 21

METHOD OF PROVIDING URBAN HIKING TRAILS

CROSS-REFERENCE TO RELATED APPLICATIONS

The present application claims the benefit of U.S. Provisional Application No. 61/713,903, entitled "Method of Providing Urban Hiking Trails", filed on Oct. 15, 2012, the contents of which is incorporated herein in its entirety.

FIELD AND BACKGROUND

An example embodiment of the present invention generally relates to the field of travel-oriented mobile applications with social media components. Specifically, an example embodiment of the present invention is an application that provides its registered users the ability to create, log, experience and share experiences, sites, editorial commentary, photos and videos along newly created and defined "urban hiking trails" (i.e., walking tours within cities) and allows its merchant partners the ability to provide focused targeted advertising to the users that have begun or are about to physically experience such walking tours. Applicant has discovered problems with and related to travel oriented applications. Through applied effort, ingenuity, and innovation, Applicant has solved many of these identified problems by developing a solution that is embodied by the present invention, which is described in detail below.

BRIEF SUMMARY

Example embodiments of the present invention provide a social discovery engine that addresses the gaps in the user and merchant experience. In some embodiments, once the user logs in, for example via use of a mobile device (including but not limited to smart phones or tablets), the user may be presented with the option of taking a walking tour (walking tour, tour, and hike may be used interchangeably herein), creating a walking tour or reviewing past experiences. In some embodiments, once a merchant logs in, the merchant will be given a dashboard that allows it to control its advertising and/or publish offers, deals, discounts, etc., to the users that are either on the walking tour or that have identified the merchant's Stop as somewhere he or she would like to re-visit.

Certain example embodiments of the present invention provide the user with walking tours that are crowd-sourced, i.e., created by other users. Existing walking tours may be sorted by the user by starting point (either near the user's present location or at some other nearby starting point identified by the user), tour distance (in length), ratings (sourced from other users) and based upon the kinds of Stops that can be found along the trail. For example, if a user would like to spend an afternoon in a particular city neighborhood, that user can log in and search for available walking tours within that neighborhood that meet the user's needs for the tour (e.g., less than 3 miles in length, less than 0.5 miles from the hotel, that features coffee shops). In some embodiments, the user can discriminate among available tours based upon the ratings that other users have given the tour. In some embodiments, the user may be able to search for walking tours that are within a short distance from the user's current location or within the particular locality where the user is currently located, such as through an application user interface on a mobile device or via mobile web browser. In some embodiments, a user may be able to search for or review walking tours that are provided in any one of a plurality of locations (e.g., cities, localities, etc.), such as through a web site or portal.

Certain example embodiments of the present invention provide the user with the ability to create walking tours for other users to use. Should the user decide to create a walking tour, he or she will be given the option to do so through an easy-to-use sequence of logging in, cataloguing and marking Stops along the walking tour and providing Stop Content about each Stop along the way. The commentary contained in the Stop Content may be restricted in number of characters and in type. The text utilized in such commentary may be utilized to tag the walking tour for future users.

Certain example embodiments of the present invention may provide a merchant with the ability to advertise to users on the go. Merchant partners may be able to maximize their customer actualization in a number of ways. In some embodiments, merchant partners may be entitled to publish Offers to users in the map screen and walking tour detail screen before each walking tour, to incentivize users to take the hike as well as to check in once they arrive at the merchant's Stop on the tour. In some embodiments, merchant partners may be able to publish offers to the user in a saved places feature on the application. In some embodiments, merchant partners may also be able to exercise premium partnership status via highlighted location placement in the vicinity of the walking tours, whether the merchant is on the tour or not.

In one embodiment, a method of generating a hike on a device is provided that at least includes receiving an indication to create a tour using a device; determining a starting point of the tour; capturing route and location information corresponding to the movement of the device during the tour; receiving indications of one or more stops on the tour route; capturing data associated with the one or more stops, wherein the data includes one or more of: tips, recommendations, commentary, ratings, and images; and receiving an indication that the tour is complete, wherein the tour is configured to be stored or distributed via one or more social networks.

In some embodiments, the tour is created by a user of an application and shared with other users of the application. In some embodiments, the starting point of the tour is selected from a list of one or more locations near the current location of the device.

In some embodiments, the method may further comprise receiving one or more of: tips, recommendations, commentary, ratings, and images; and linking the received one or more tips, recommendations, commentary, ratings, and images to a stop on the tour route. In some embodiments, the method may further comprise generating stop information, wherein the stop information is generated from one or more data source providers based on at least one of location data associated with the stop, recommendations, commentary, ratings, and images.

In some embodiments, storing the completed tour further comprises providing the completed tour to one or more social networks.

In another embodiment, a method of negotiating a hike on a device is provided that at least includes displaying details about one or more tours on the list in response to an indication to display a list of tours on a device; receiving a selection of the tour to be started; displaying routing information for the tour; wherein the routing information comprises a route for the tour and one or more stops along the route; providing details about the one or more stops on a tour, wherein the stop details include one or more of: name, location, ratings, tips, recommendations, commentary, and offered deals; and capturing data associated with an experience of the tour.

In some embodiments, the details about the one or more tours comprises one or more of: a rating, a number of stops, types of stops, names of stops, length of tour, images of tour. In some embodiments, capturing data associated with an experience of the tour comprises receiving an indication that a user is at a stop location. In some embodiments, capturing data associated with an experience of the tour comprises receiving one or more of: a rating, a comment, a recommendation, a captured image, and a captured video.

In some embodiments, the method may further comprise providing details regarding a tour participant to one or more stop entities. In some embodiments, the method may further comprise providing stop deal offers and displaying the deal offers along with the one or more stops in the routing information.

In another embodiment, an apparatus for generating a hike is provided that includes at least one processor and at least one memory including computer program instructions, the at least one memory and the computer program instructions configured to, with the at least one processor, cause the apparatus at least to receive an indication to create a tour using a device; determine a starting point of the tour; capture route and location information corresponding to the movement of the device during the tour; receive indications of one or more stops on the tour route; capture data associated with the one or more stops, wherein the data includes one or more of: tips, recommendations, commentary, ratings, and images; and receive an indication that the tour is complete, wherein the tour is configured to be stored or distributed via one or more social networks.

In some embodiments, the apparatus may further comprise the at least one memory and the computer program instructions being configured to, with the at least one processor, cause the apparatus at least to receive one or more of: tips, recommendations, commentary, ratings, and images; and link the received one or more tips, recommendations, commentary, ratings, and images to a stop on the tour route.

In some embodiments, the apparatus may further comprise the at least one memory and the computer program instructions being configured to, with the at least one processor, cause the apparatus at least to generate stop information, wherein the stop information is generated from one or more data source providers based on at least one of location data associated with the stop, recommendations, commentary, ratings, and images. In some embodiments, storing the completed tour further comprises providing the completed tour to one or more social networks.

In another embodiment, an apparatus for negotiating a hike is provided that includes at least one processor and at least one memory including computer program instructions, the at least one memory and the computer program instructions configured to, with the at least one processor, cause the apparatus at least to display details about one or more tours in response to an indication to display a list of tours on a device; receive a selection of the tour to be started; display routing information for the tour; wherein the routing information comprises a route for the tour and one or more stops along the route; provide details about the one or more stops on the tour, wherein the stop details include one or more of: name, location, ratings, tips, recommendations, commentary, and offered deals; and capture data associated with an experience of the tour.

In some embodiments, the apparatus may further comprise the at least one memory and the computer program instructions configured to, with the at least one processor, cause the apparatus to provide details regarding a tour participant to one or more stop entities. In some embodiments, the apparatus may further comprise the at least one memory and the computer program instructions configured to, with the at least one processor, cause the apparatus to provide stop deal offers and displaying the deal offers along with the one or more stops in the routing information.

In another embodiment, a computer program product is provided that at least includes at least one non-transitory computer-readable storage medium bearing computer program instructions embodied therein for use with a computer, the computer program instructions comprising program instructions configured to receive an indication to create a tour using a device; determine a starting point of the tour; capture route and location information corresponding to the movement of the device during the tour; receive indications of one or more stops on the tour route; capture data associated with the one or more stops, wherein the data includes one or more of: tips, recommendations, commentary, ratings, and images; and receive an indication that the tour is complete, wherein the tour is configured to be stored or distributed via one or more social networks.

In some embodiments, the computer program product may further comprise program instructions configured to receive one or more of: tips, recommendations, commentary, ratings, and images; and link the received one or more tips, recommendations, commentary, ratings, and images to a stop on the tour route. In some embodiments, the computer program product may further comprise the computer program instructions further comprising program instructions configured to generate stop information, wherein the stop information is generated from one or more data source providers based on at least one of location data associated with the stop, recommendations, commentary, ratings, and images.

In another embodiment, a computer program product is provided that at least includes a computer program product comprising at least one non-transitory computer-readable storage medium bearing computer program instructions embodied therein for use with a computer, the computer program instructions comprising program instructions configured to display details about one or more tours in response to an indication to display a list of tours on a device; receive a selection of the tour to be started; display routing information for the tour; wherein the routing information comprises a route for the tour and one or more stops along the route; provide details about the one or more stops on the tour, wherein the stop details include one or more of: name, location, ratings, tips, recommendations, commentary, and offered deals; and capture data associated with an experience of the tour.

In some embodiments, the computer program product may further comprise program instructions configured to provide details regarding a tour participant to one or more stop entities. In some embodiments, the computer program product may further comprise program instructions configured to provide stop deal offers and displaying the deal offers along with the one or more stops in the routing information.

In another embodiment, an apparatus for generating a hike is provided that includes at least means for receiving an indication to create a tour; means for determining a starting point of the tour; means for capturing route and location information corresponding to the movement of the device during the tour; means for receiving indications of one or more stops on the tour route; means for capturing data associated with the one or more stops, wherein the data includes one or more of: tips, recommendations, commentary, ratings, and images; and means for receiving an indication that the tour is complete, wherein the tour is configured to be stored or distributed via one or more social networks.

In another embodiment, an apparatus for negotiating a hike is provided that includes at least means for displaying details about one or more tours on the list in response to an indication to display a list of tours; means for receiving a selection of the tour to be started; means for displaying routing information for the tour; wherein the routing information comprises a route for the tour and one or more stops along the route; means for providing details about the one or more stops on a tour, wherein the stop details include one or more of: name, location, ratings, tips, recommendations, commentary, and offered deals; and means for capturing data associated with an experience of the tour.

BRIEF DESCRIPTION OF THE DRAWINGS

Figure 1:
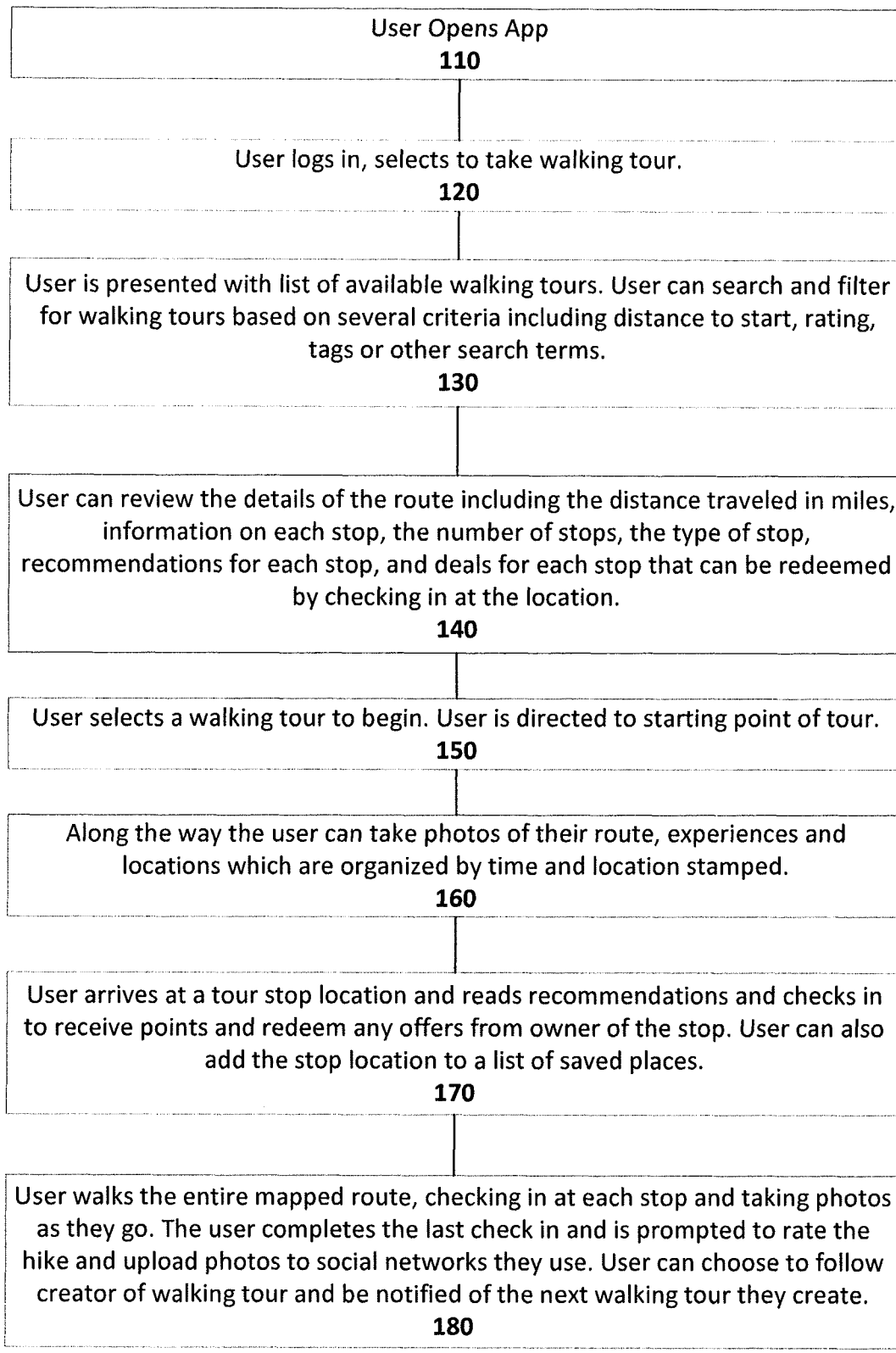
Figure 2:
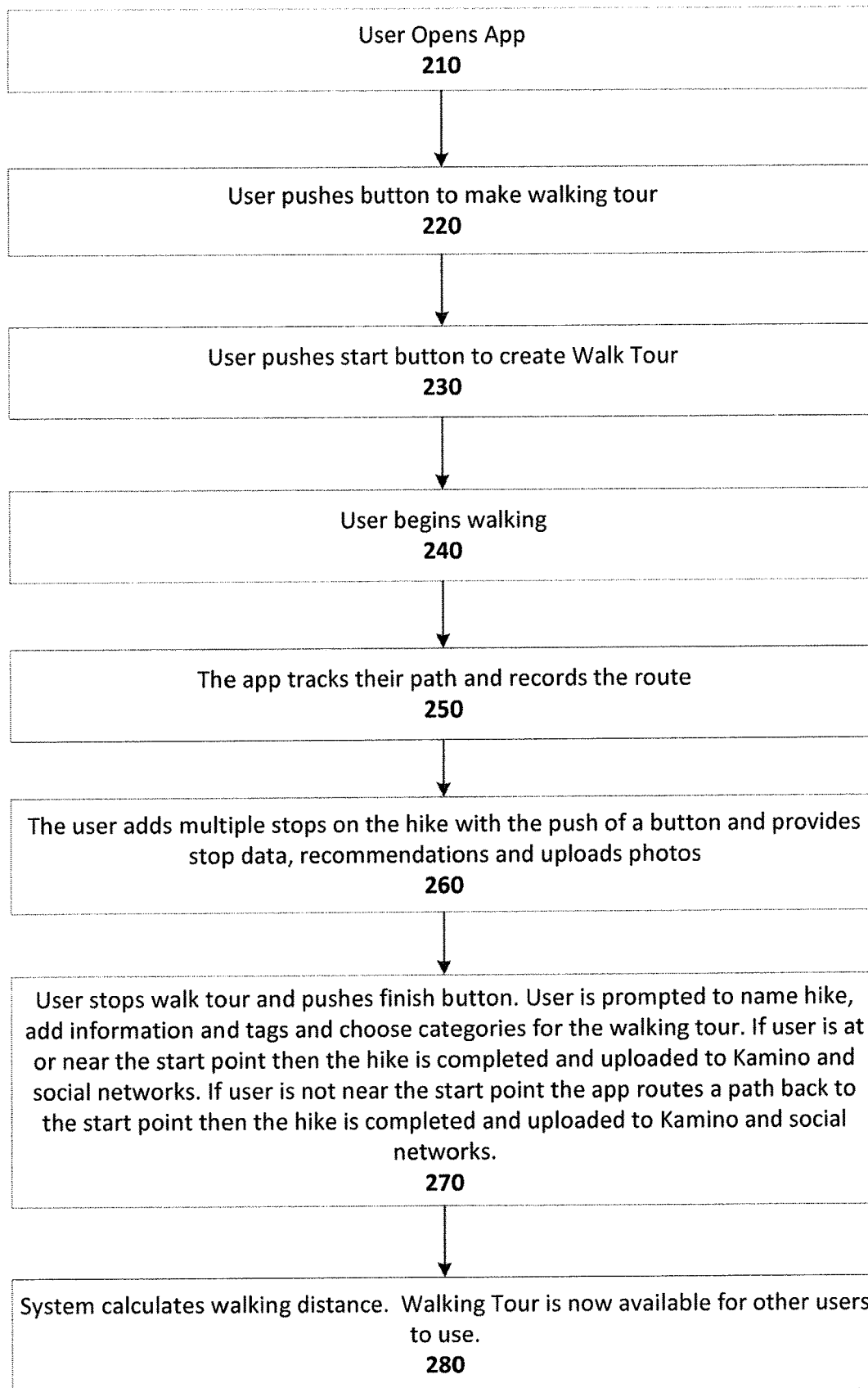
Figure 3:
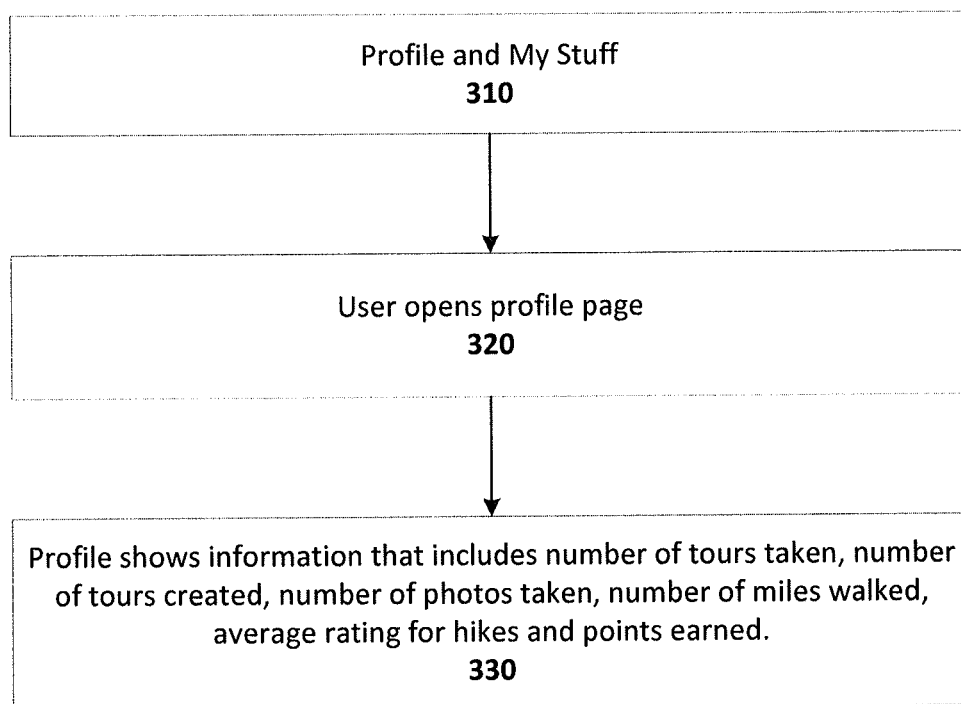
Figure 4:
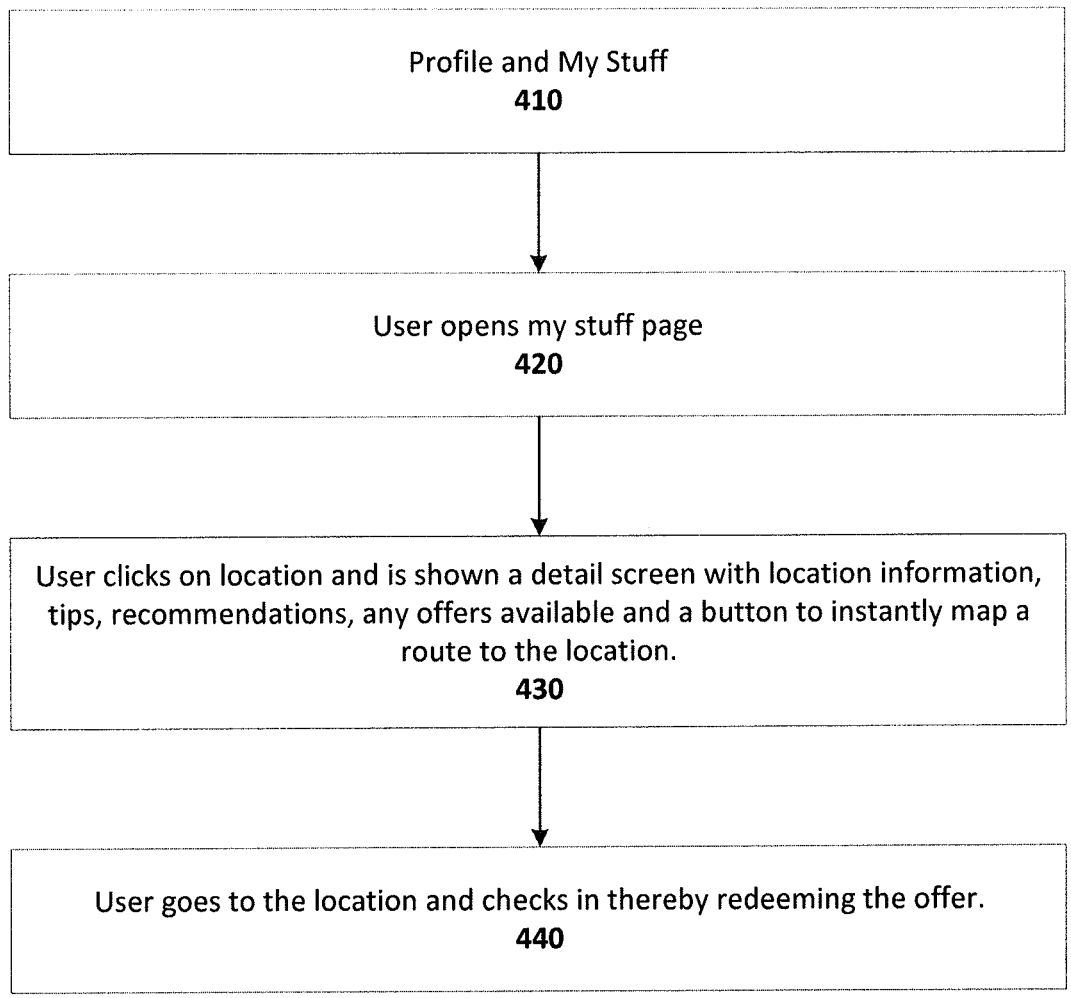
Figure 5:
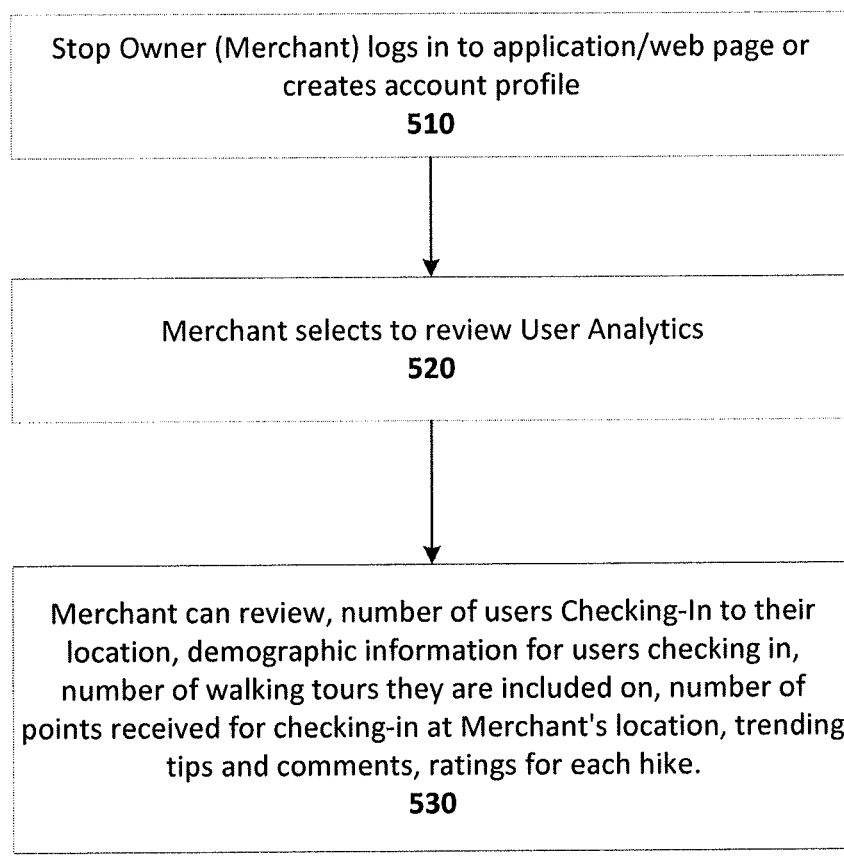
Figure 6:
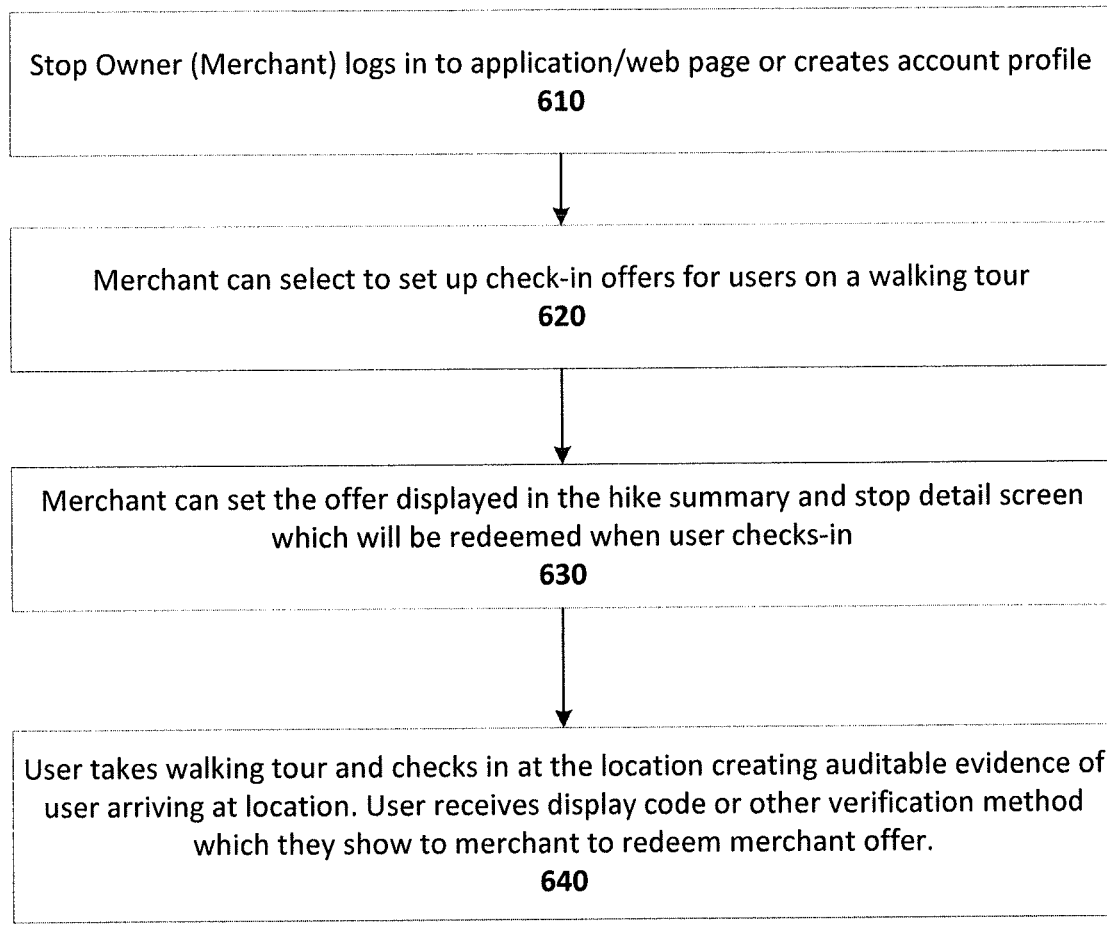
Figure 7:
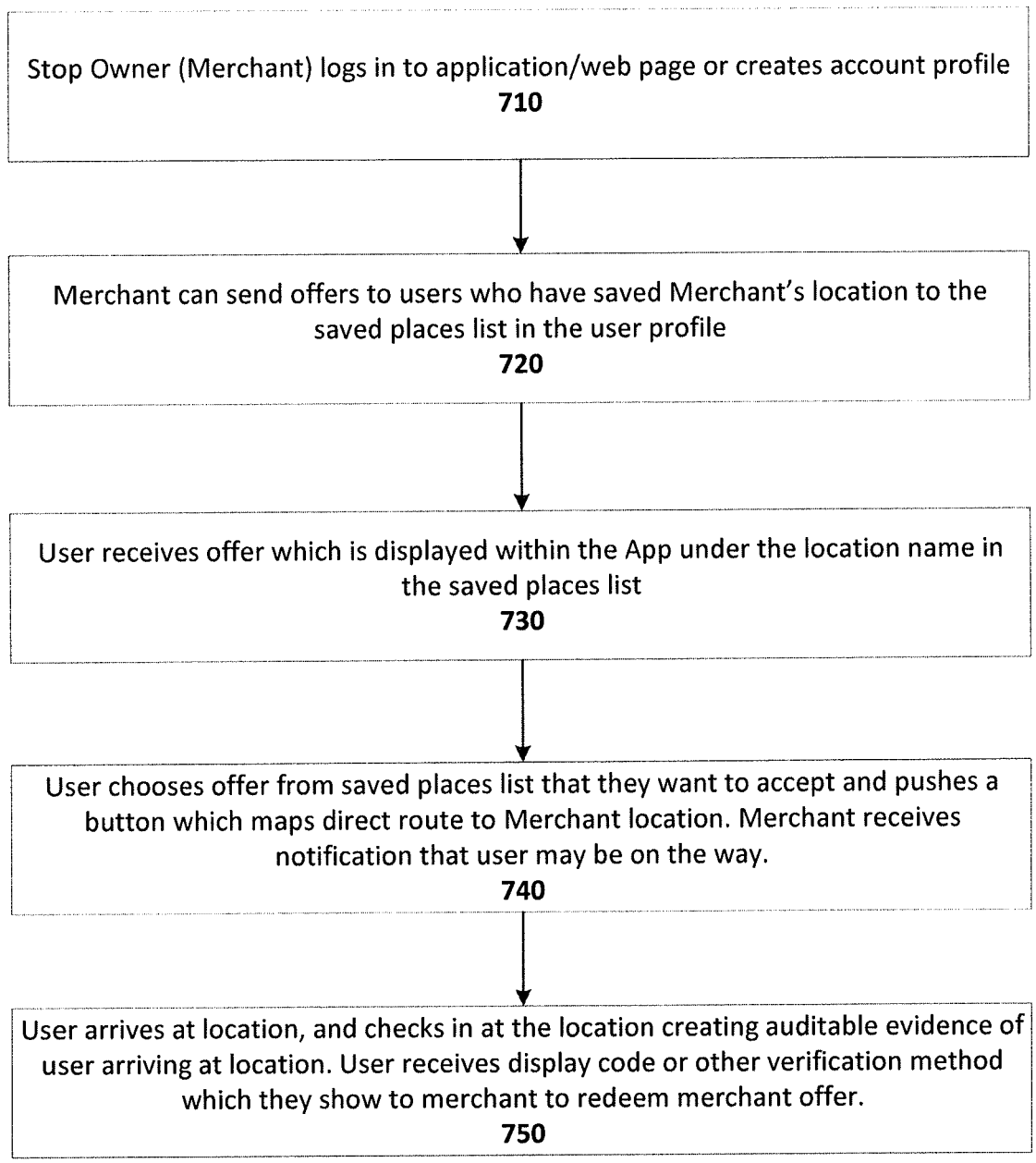
Figure 8:
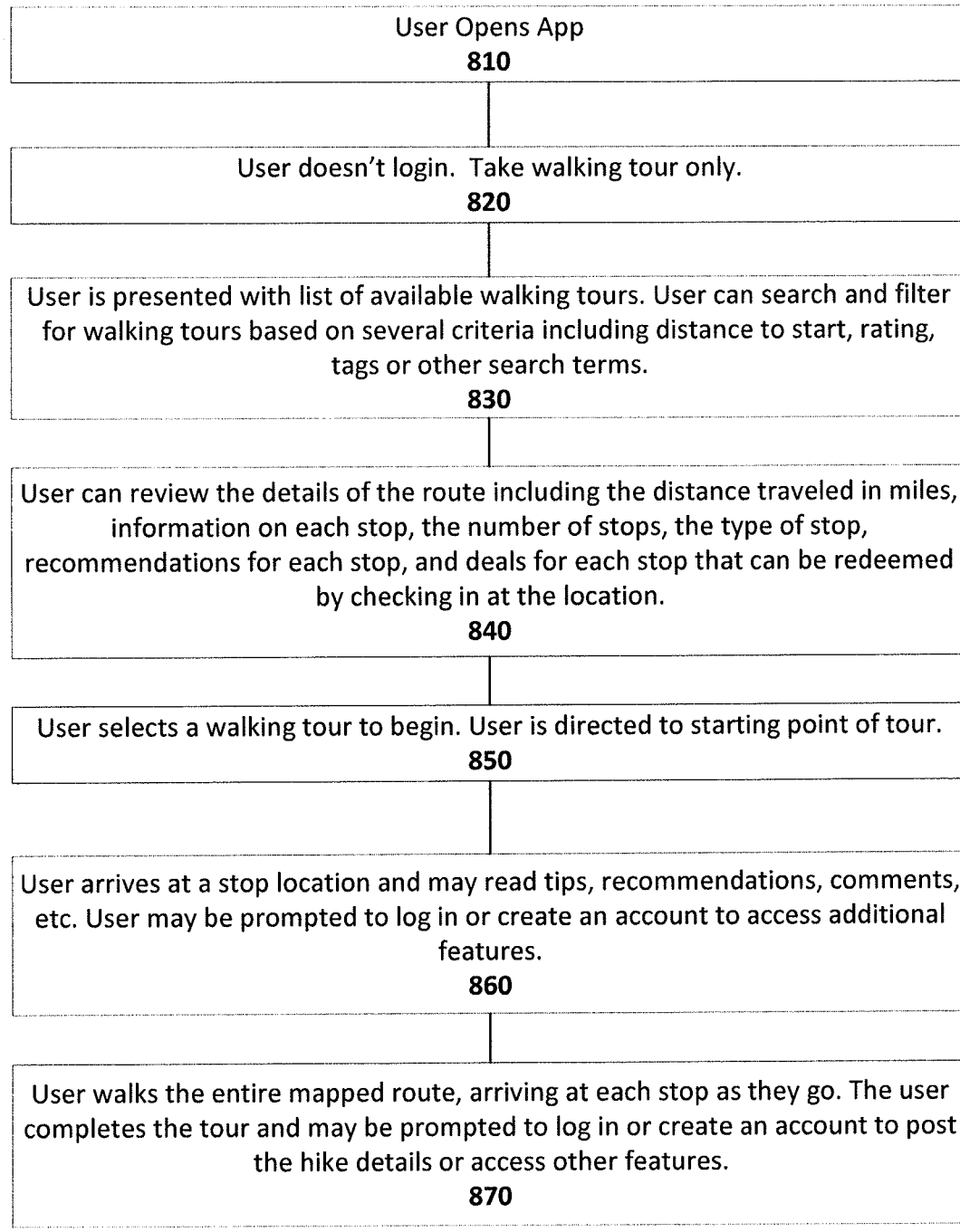
Figure 9:
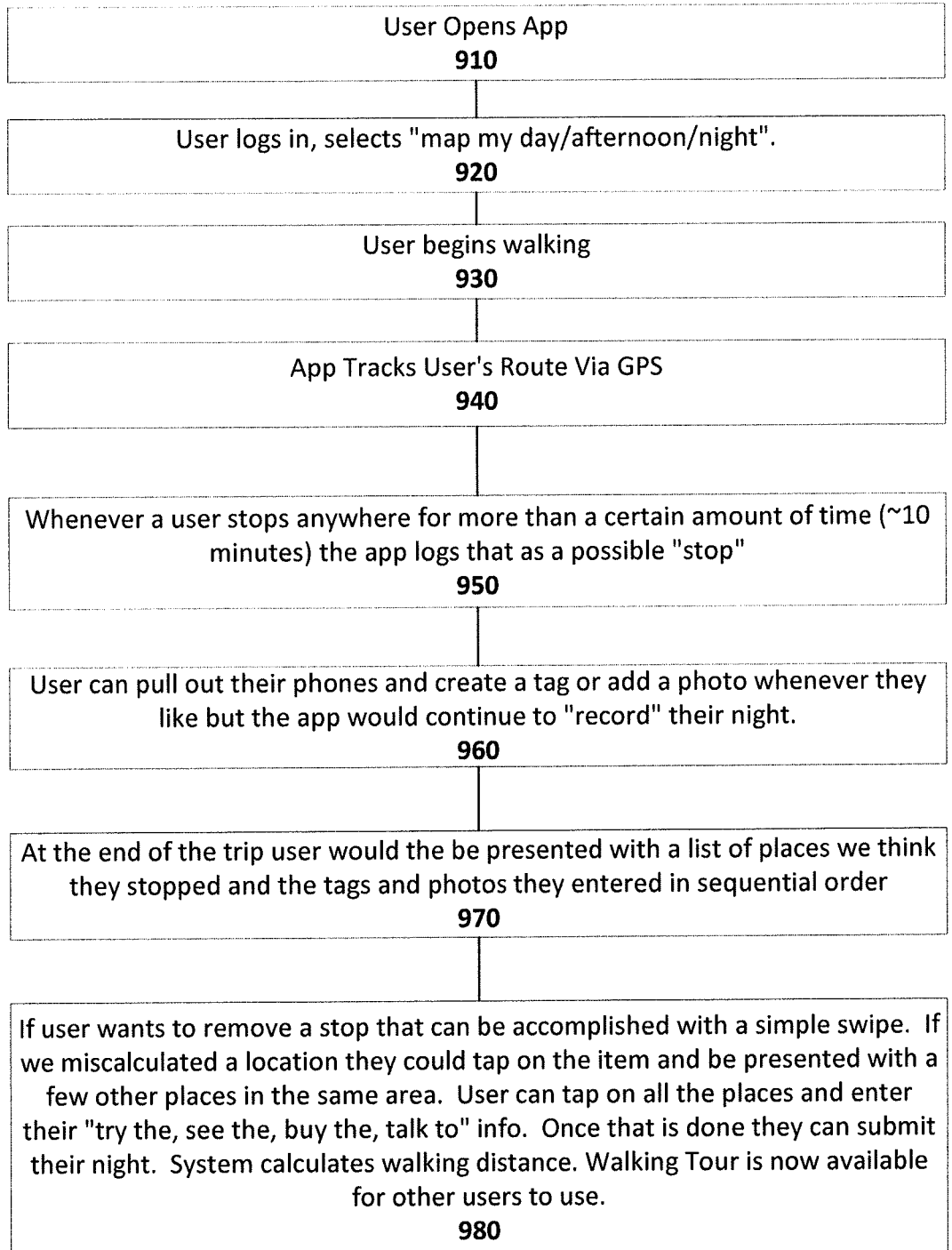
Figure 10:
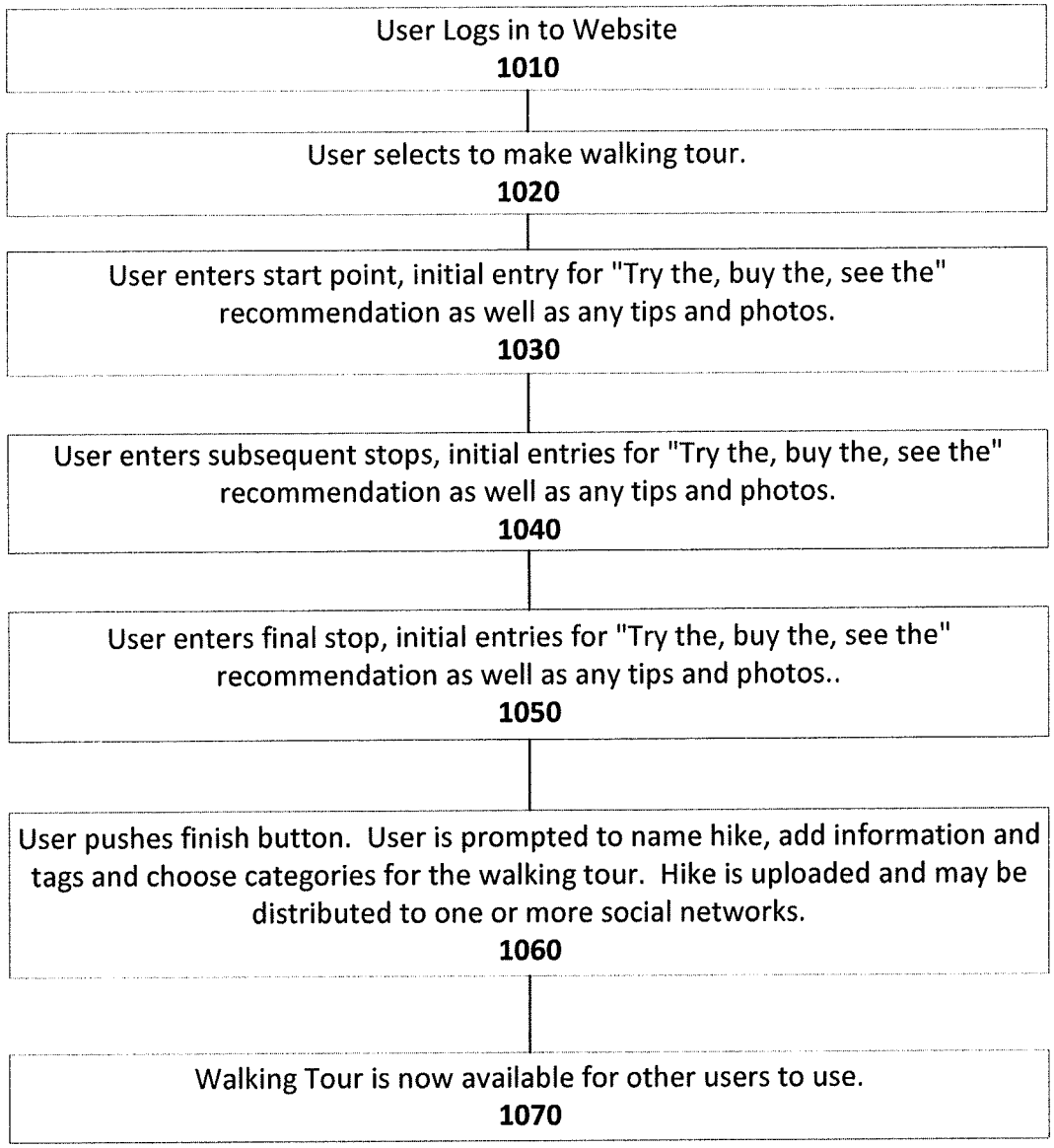
Figure 11:
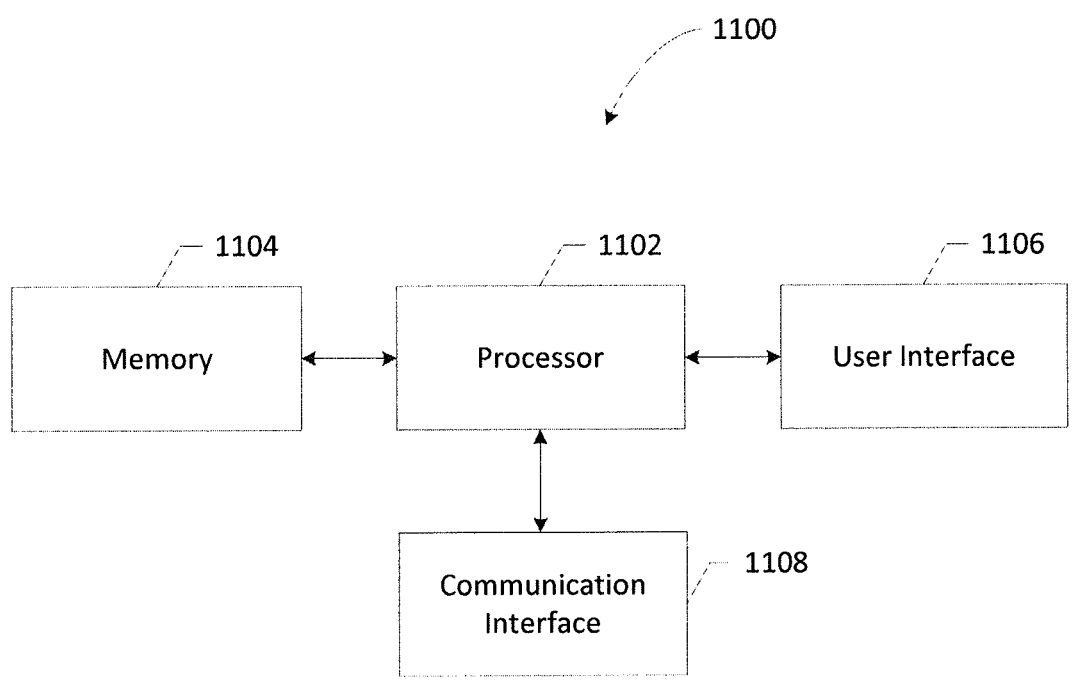

Having thus described embodiments of the invention in general terms, reference will now be made to the accompanying drawings, which are not necessarily drawn to scale, and wherein:

FIG. 1 illustrates a block diagram of a user interacting with one embodiment of present invention to take a walking tour;

FIG. 2 illustrates a block diagram of a user interacting with one embodiment of present invention to create a walking tour;

FIG. 3 illustrates a block diagram of a user's profile page within one embodiment of the present invention;

FIG. 4 illustrates a block diagram of a user's saved places page within one embodiment of the present invention;

FIG. 5 illustrates a block diagram of a merchant review control panel within one embodiment of the present invention;

FIG. 6 illustrates a block diagram of a merchant's ability to present offers within one embodiment of the present invention;

FIG. 7 illustrates a block diagram of a merchant's interaction with another embodiment of the present invention;

FIG. 8 illustrates a block diagram of a user interacting with another embodiment of present invention to take a walking tour;

FIG. 9 illustrates a block diagram of a user interacting with another embodiment of present invention to create a walking tour;

FIG. 10 illustrates a block diagram of a user interacting with another embodiment of present invention to create a walking tour;

FIG. 11 illustrates a block diagram of an apparatus that may be specifically configured in accordance with an example embodiment of the present invention; and FIGS. 12-30 illustrate some example user interface displays in accordance with some embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

There are various forms of travel-oriented mobile applications in the marketplace at the present time that take on a social media component. Namely, these are travel-oriented mobile applications that provide the general public with information about specific merchants (including, restaurants, bars, clubs, stores and other sights and points of interest) (collectively, "Stops") and that allow registered users to be able to post, edit and share information and photos (collectively, "Stop Content") with other users and the general public about these Stops. In some cases, the Stop Content being provided about the Stops is proprietary information that is sourced from third party merchants by the application publishers and shared with the registered users. Examples of this would include: Field Trip, where editorial information about a Stop is sourced from the likes of Zagat's guides, Food Network and Thrillist, and the Travel Channel's Anthony Bourdain: The Layover Application, where the Stop Content is sourced and published by the purveyors of the application as a tie in to the television show of the same name. In most cases, however, the information is "crowd-sourced", i.e., sourced from the pool of registered users. Examples of applications that employ this method would include Trip Advisor and Yelp.

Generally, the travel-oriented mobile applications that provide crowd-sourced Stop Content are limiting in that they only provide information about the specific Stop that the user requests. For example, on Yelp or Trip Advisor, a user may look up a specific Stop and receive ratings, commentary and in some cases photos of the specific Stop they are searching for. However, in the alternative, the travel-oriented applications that provide Stops in sequence, are limiting in that all of the content (including the identity of the Stops themselves) is proprietarily produced. For example, although on the The Layover Application, users can view the Stops in sequence, all of the Stops are identified by a third party merchant and generally derive from the specific episode of The Layover (the television show) that pertains to the city where such Stops reside.

With some of these applications, the merchant proprietors of these Stops may (for a fee, or revenue share) be granted the rights to publish offers for daily deals, coupons or vouchers ("Offers") to registered users. This can occur via an email to a registered list (example: Living Social, Groupon or Amazon Local), via posts to users that "like" the merchant (example: Facebook), or via publishing their location in script with an icon on a map.

However, notwithstanding the existence of various types of travel-oriented mobile applications in the market place, there continues to be significant gaps in the user and merchant experience.

None of these applications provides the Stops in any sort of sequence that (1) provides the user with the crucial combination of crowd-sourced Stops and the ability to experience the sequence of Stops, on foot, in bundles, the way that most users would likely enjoy them or share them if they were communicating outside of the application structure, (2) allows the merchants along the tour to know with reasonable certainty which users are on their way to their Stop, giving the merchant the opportunity to publish their Offers to a higher degree of customer actualization or (3) provides merchants with an auditable trail that telegraphs the user's likely pathway from the moment he or she logs into the walking tours until they arrive at the merchant's door step.

Methods, apparatuses, and computer program products are provided in accordance with example embodiments to enable a user the ability to create, log, experience and share experiences, sites, editorial commentary, photographs, and videos along either newly created or already defined tours, routes, or hikes, which may be called "urban hiking trails" (i.e. walking tours within cities).

Embodiments of the present invention provide a social discovery engine that addresses the gaps in the user and merchant experience that exist in the marketplace in one easy to use application. In some embodiments, once the user logs in, for example via use of a mobile device (including, but not limited to, smart phones or tablets), the user may be presented with the options of taking a walking tour, creating a walking tour, or reviewing past experiences. In some embodiments, once a merchant logs in, the merchant may be given a dashboard that may allow it to review analytics and control its advertising and/or publish Offers to the users that are either on the walking tour or that have identified the merchant's Stop as somewhere he or she would like to re-visit.

Some embodiments may provide the user with walking tours that are crowd-sourced, i.e., have been created by other users. Existing walking tours may be searched and/or sorted by the user by starting point (either near the user's present location or at some other starting point identified by the user), tour distance (in length), ratings (sourced from other users), featured tours, and/or based upon the kinds of Stops that can be found along the tour. For example, if a user would like to spend an afternoon in a particular city neighborhood, that user can log in and search for available walking tours within that neighborhood that meet the user's needs for the tour (e.g., less than 3 miles in length, less than 0.5 miles from the hotel, that features coffee shops). In some embodiments, the user can discriminate among available tours based upon the ratings that other users have given the tour.

Some embodiments may provide the user with the ability to create walking tours that may be followed by other users. Should the user decide to create a walking tour, he or she will be given the option to do so through an easy-to-use sequence of logging in, cataloguing and marking Stops along the walking tour and providing Stop Content about each Stop along the way. The commentary contained in the Stop Content may be restricted in number of characters and in type. Tags may be derived from the text utilized in such commentary or additional key words or descriptors users may associate with the walking tour or Stop Content for the benefit of future users.

While the example embodiments describe an online interaction between the user and the application, in some embodiments the user may be provided with the ability to use the various features off-line, such as downloading tours to a device for use when the device is not connected to a network, for example. In some embodiments, such off-line features may be provided to a user upon payment of a purchase or subscription fee.

Some embodiments may provide the merchant with the ability to advertise to users on the go. Merchant partners may be able to maximize their customer actualization in a number of ways. In some embodiments, merchant partners may be entitled to publish Offers to users in the map screen and walking tour detail screen before each walking tour, to incentivize users to take the hike as well as to check in once they arrive at the merchant's Stops. In some embodiments, merchant partners may be able to publish Offers to the user in a saved places feature on the application. In some embodiments, merchant partners may also be able to exercise premium partnership status via highlighted location placement in the vicinity of the walking tours, whether the merchant is on the tour or not.

FIG. 1 is an example block diagram of a user's interaction with one embodiment of the present invention when taking a tour. For example, the user begins interaction by opening the application or app 110, such as on a mobile device, or by other means of interacting with a computer application, including through a web based portal. Once the application is open, the user may log in and choose to take a walking tour 120, such as illustrated by the example user interface displays of FIGS. 12 and 13. Alternatively, the user may choose to forgo logging in and continue through a limited user experience as a guest, as described in regard to FIG. 8 below. Without logging in, the user may be exposed to only limited functionalities of the entire application, for example the user may only be able to take a walking tour without accessing additional features along the tour (e.g., user may not be able to check-in, redeem Offers, vote, add ratings, add comments, access a profile, upload photos, etc.).

While the example embodiments describe walking tours, it should be noted that tours, however, are not limited to walking tours. Other means of transportation may be used, for example bicycles, buses, jogging, driving, or other forms of public transportation, or the like.

After indicating a desire to take a walking tour, such as by selecting the "Take A Hike" button illustrated in FIG. 13, the user may be presented with a list of available tours and with various options to select or filter specific tours based on various criteria 130, such as distance to start, rating, tags, or other user-determined search terms. For example, the user may sort or search for tours by categories such as Most Popular, Nearby, or Featured, as well as searching by tour features, tags, keywords, or the like. In some embodiments, the list of available tours may be based in part on preferences contained within a user profile. FIG. 14 provides an example user interface display illustrating a list of nearby tours.

The user may select a tour and review 140 the details of the tour, including the distance traveled, information regarding Stops, number of Stops, types of Stops, recommendations, comments, or photos for each Stop, and deals or offers for each Stop that can be redeemed by checking in at the Stop location, such as illustrated in FIG. 15. In some embodiments, the user may also be able to view on overview map of the tour which may, for example, display the route, the various Stops, and other tour details, such as illustrated in FIG. 16. In some embodiments, the user may also be able to review comments about the hike posted by other users, such as illustrated in FIG. 17. In some embodiments, the user may be able to review additional details for a Stop on the tour, such as by selecting the Stop from the listing, as illustrated in FIG. 15. The additional Stop details may include address details, hours of operation, ratings, tips, deal offers, or the like, such as illustrated in the example user interface of FIG. 18.

Once the user has determined the tour that he/she wants to take, that tour may be selected and activated 150. In some embodiments, if the user is not currently at the starting point of the tour, the user will be directed to the starting point, where the user may be able to check in and start the tour. Upon starting the tour, in some embodiments, the user may be provided with a detailed map that follows the defined route and provides indications of the designated Stops, tour photos, comments and tips, or the like, such as illustrated in the example user interface of FIG. 19. In some embodiments, the user may select the indications on the map to display photos or Stop details associated with the tour, such as illustrated in the example user interfaces of FIGS. 20 and 21.

As the user progresses physically along the tour, the user may take photographs or video 160 of the route, Stops along the route, and/or merchants along the route, etc., such as by selecting the "Add Photo" button in FIG. 19 in some embodiments. In some embodiments, these photographs or videos may be geotagged and/or date/time stamped and may be automatically stored by time and/or location, such as in a user profile, for example.

Figure 22:
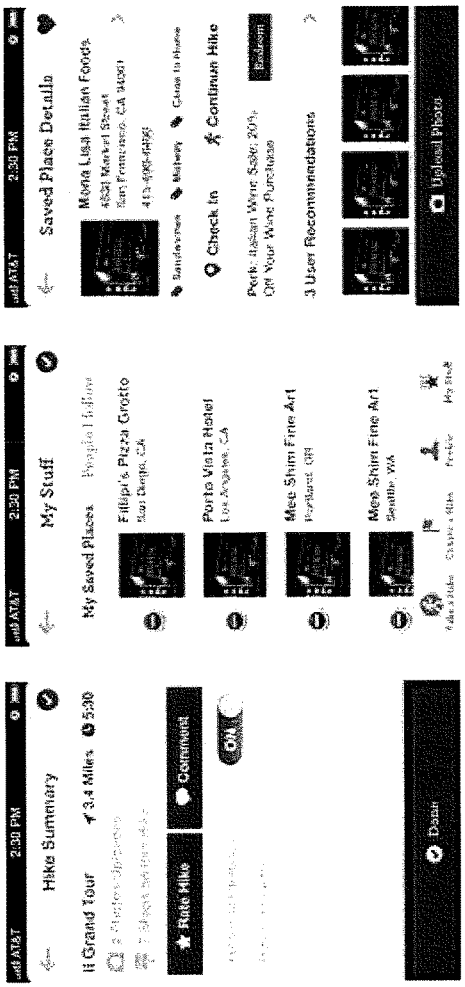
Figure 23:
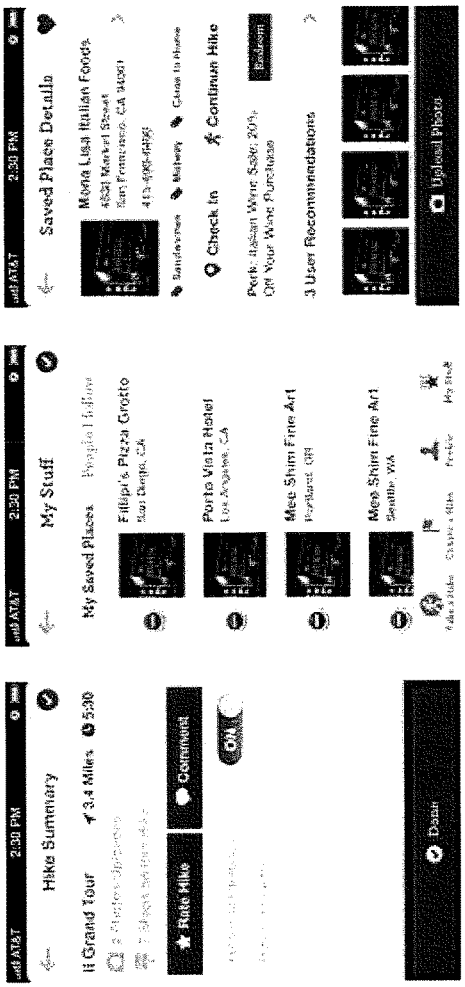

Along the route, the user will arrive at various locations and/or Stops 170. In some embodiments, the user may select to view details for the Stop, such as illustrated in FIG. 22. The user may check in to receive points and/or redeem any Offers from the owner of the Stop. In some embodiments, the user may also view and/or vote on tips provided for the Stop, for example as illustrated in FIG. 23, rate the Stop, as well as add comments about the Stop. In some embodiments, the user may be able to add the Stop to a list of saved places, such as by selecting the heart icon illustrated in FIG. 22. In some embodiments, upon selecting a Stop to be added to the user's saved places, the Stop details may be available as part of the user's profile.

In some embodiments, the Stop details may include Tips suggested by other users, which may comprise recommendations provided in a defined and/or concise format, such as to provide a core idea of the recommendation. For example, in some embodiments, Tips may be provided in a short sentence format such as "Try the . . . ", "Buy the . . . ", "See the . . . " where the preambles may be selected from a defined list and a user may add a few words to complete the Tip sentence (e.g. "Try the prosciutto sandwich."). FIG. 23 illustrates an example user interface display of Tips for a Stop. In some embodiments, users taking a walking tour may be able to vote on the Tips provided for a Stop after checking-in to the Stop, such as by selecting a vote button ("+1") as illustrated in FIG. 23. In some embodiments, a user taking a walking tour may add one new Tip or vote on one existing Tip for each Stop while they are on the current tour. In some embodiments, a walking tour creator may be provided certain editorial or curating ability for the Tips (or other user-added content) for any walking tour they created. In some embodiments, the Tips and voting may be used to derive analytics for a Stop merchant.

Figure 24:
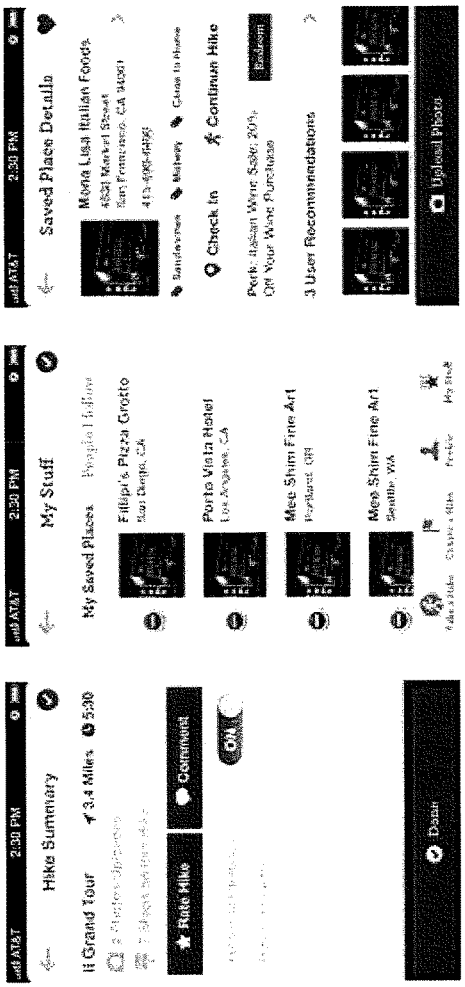
Figure 25:
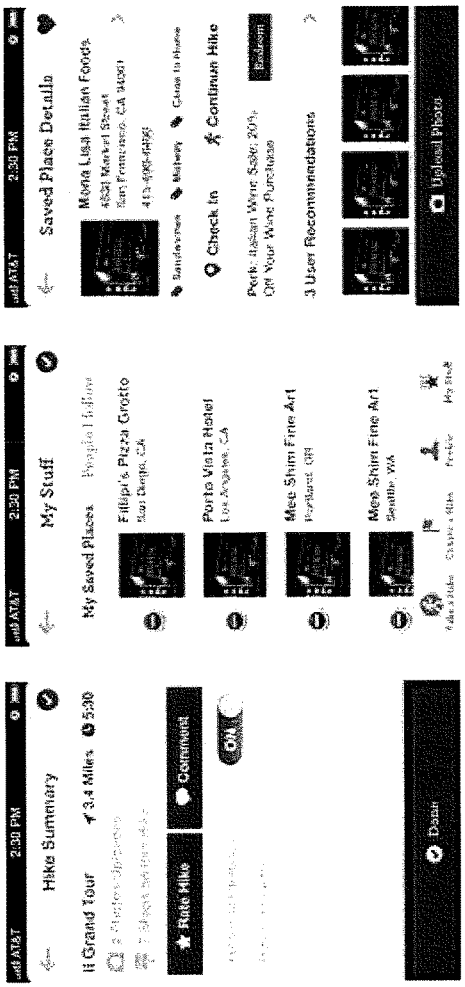

The user can continue and traverse the entire mapped route 180 and the user may check in at each Stop along the route. After the last Stop check in, the user may be presented with a summary of the hike, may be prompted to rate the hike, comment on the hike, upload photographs taken during the hike, and/or publish details or photos of the hike to any social networks that that may use. FIG. 24 illustrates an example user interface display of a hike summary. The user may also be presented with the option to follow the creator of the hike and/or be notified of other tours that are available. In some embodiments, any saved places the user added during the tour will now be available in the user's profile, such as illustrated in FIG. 25.

FIG. 2 is an example block diagram of an embodiment of the present invention wherein a user creates a walking tour. Once again, the user opens the application 210 in order to interact with its functionalities.

Figure 27:
Figure 28:
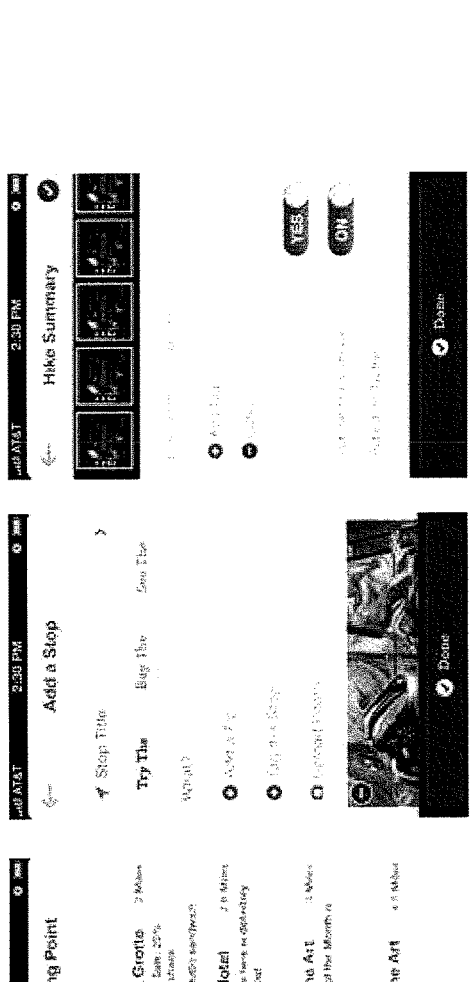
Figure 29:
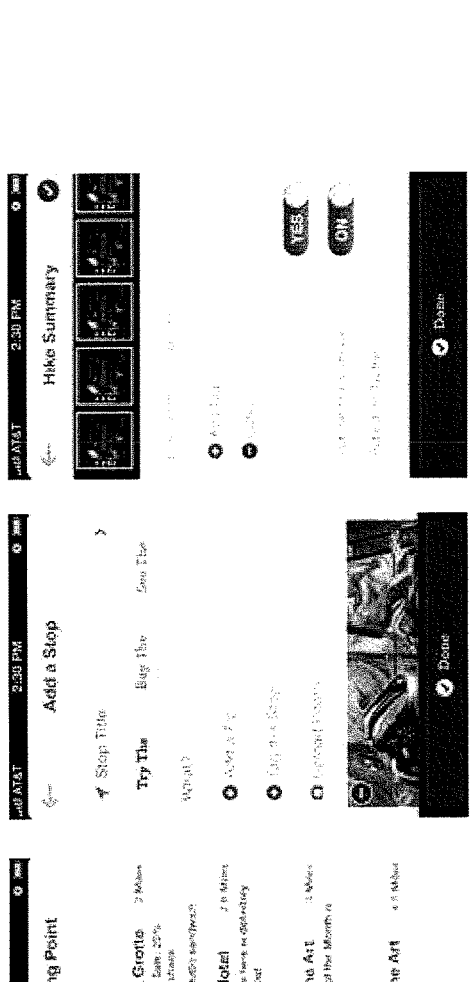

In this example, the user indicates that he wants to make a new walking tour 220, such as by selecting the "Create A Hike" button illustrated in FIG. 13. The user may physically go to the location of the beginning of the walking tour, and push the start button to create the walk 230, such as illustrated in FIG. 27. In some embodiments, the user may select a start point from a list of nearby locations, such as illustrated in FIG. 28. The mobile device being used may use various location technologies to log the user's location, for example via GPS or location-based WiFi. The user then begins moving, for example by walking 240. As the user moves, the application tracks his path and records the route taken 250. Along the way, the user can add Stops to the hike by interacting with a button on the application 260. The user can add whatever details about the Stop that he desires, including Stop details, tips, photographs, and/or recommendations, as illustrated in FIG. 29. In some embodiments, Stop information may be pre-populated based on data provided from a third-party, for example.

As the user walks and creates the tour, the user may take photographs or video of the route, Stops along the route, sites or merchants along the route, or the like. In some embodiments, these photographs or videos may be geotagged and/or date/time stamped and may be automatically stored by time and/or location, such as in a user profile, for example.

Figure 30:
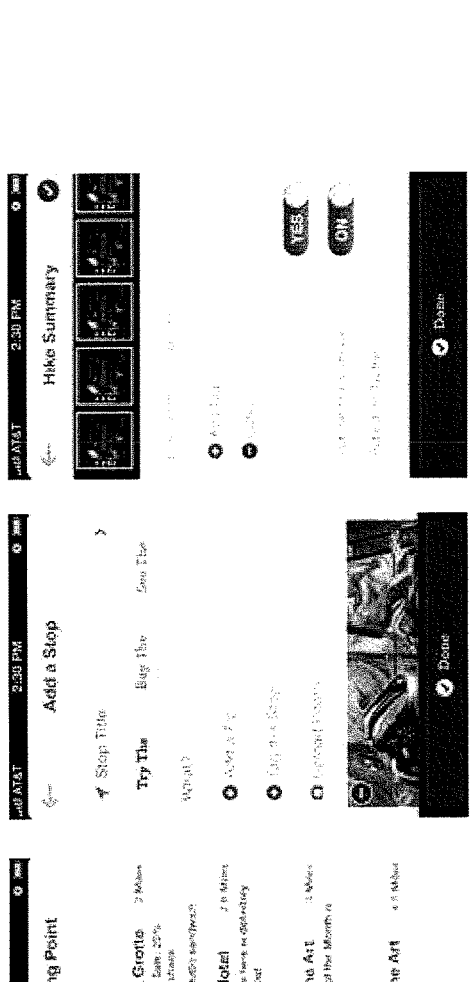

When the user arrives at the end of the hike, the user again may interact with the application by pushing a finish button, for example 270. The user may be provided with a Hike Summary and may be prompted to provide details regarding the hike, as illustrated in FIG. 30. The details can include a name, Stop names and details, other information, tags, photos, and categories. In some embodiments, the application may automatically route the hike back to the starting location if the user is no longer there. In some embodiments, the application may calculate or create certain details about the hike, for example the distance and/or time duration, and may then make the route available for other users 280. In some embodiments, the user may be able to publish tour information to a social network. In some embodiments, publishing the tour information to a social network may also provide an invitation to other users to try the tour.

FIG. 3 illustrates interactions with a user profile or profile page in accordance with some embodiments of the present invention. A user may select to access a user profile 310, which may include user information such as a name and avatar photo, a user's tour information, as well as various settings or preferences. Upon opening a profile page 320, the user may view their profile information, which may include information regarding the number of tours taken, the number of tours created, the number of photographs taken, the number of miles walked, the average rating for hikes taken or created, and/or points earned. In some embodiments, the user profile may also provide for management of photos or video that a user has taken during a tour.

In some embodiments, users may accrue points based upon several activities. For example, for those users taking hikes, points may be given for beginning hikes, stopping and/or checking in at Stops, completing hikes, and rating the hikes or Stops, or the like. Additionally, points may be given for purchases made at merchants along a hike. Additionally, points can be given for creating new hikes, for providing Stop Content along the Stops, and, for others using one's created hikes. Points can be used by the users for various purposes. For example, the higher the point rating of a user, the more desirable that user's created hikes may be to others. Additionally, points may be redeemed for various things, including discounts at merchants along a hike, or for other purposes, for example premium status with respect to application functionality, VIP events, secret codes for secret hikes, and/or frequent flyer miles.

Figure 26:
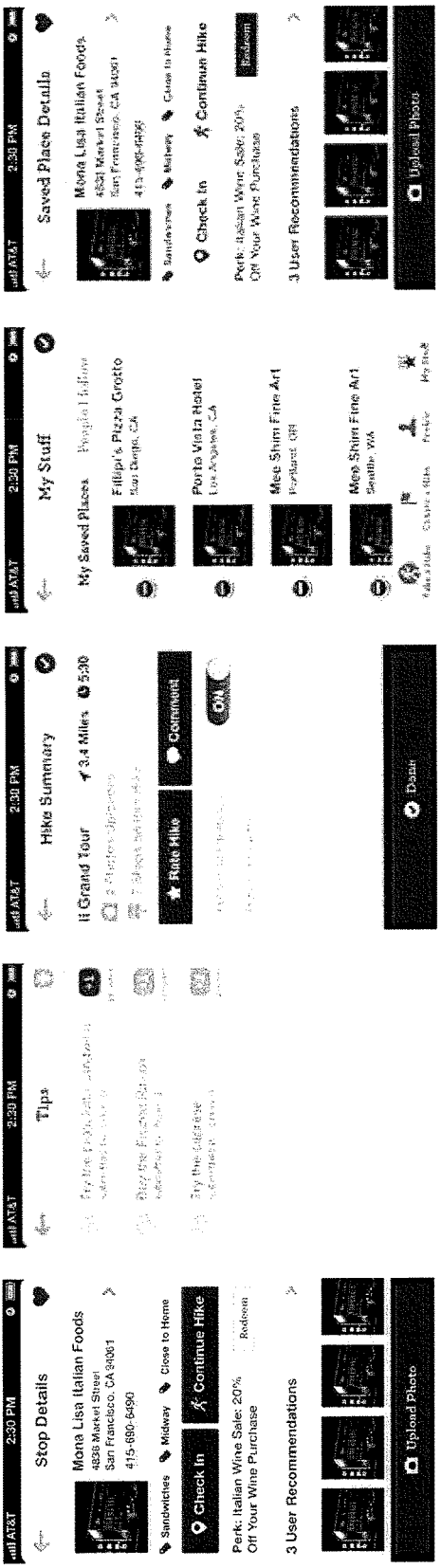

FIG. 4 illustrates interactions with a user profile providing additional information in accordance with one embodiment of the present invention. A user may open her profile 410 to view various information, in one embodiment called "My Stuff" 420. In some embodiments, a user can review information regarding particular saved locations, such as saved places created during a tour, and any Offers available from the merchant at the location 430, such as illustrated in FIGS. 25 and 26. In some embodiments, the user can indicate a desire to go to the location and be provided a route directly to that location. The user can then go to the location and redeem the Offer presented 440.

While the described embodiments generally refer to a user interacting with an application on a mobile device, a user may also access features through a web site or web portal (e.g., on any appropriate type of computing device, such as a personal computer, mobile device, tablet, smartphone, etc.), such as accessing the user's profile, searching for or reviewing walking tours, creating walking tours, or the like. In some embodiments, accessing the user profile through a web portal may allow the user to see additional or more detailed information, such as more details on hikes taken, hikes created, or the like. In some embodiments, the user may be able to view information or statistics on other users who have taken hikes created by the user, such as number of users, where users are located, user feedback, or the like.

If a merchant partner has provided an Offer to registered users via the application's map screen or via the saved places screen, then registered users will have the opportunity to redeem the offer by providing the merchant with a voucher, code, or other verification method she receives when she checks in to the Stop. To become a merchant partner, one example embodiment of the invention may require the merchant to pay a monthly subscription fee, as well as a separate fee per user check in—with each user being incentivized through points and through promotional codes to promote separate check ins by every member of the user's traveling group (if any). Some embodiments of the subscription service may provide the merchant partner access to an application based portal (with a back-end web based foundation) (the "Merchant Portal") in order to manage its account, Offers, and profile within the application, as well as the opportunity to track users on tours that feature the merchant's location as a Stop. Furthermore, some embodiments may allow the merchant partner to receive separate additional benefits depending upon the amount that the merchant partner pays in subscription fee. For instance, at a higher monthly subscription fee, the merchant partners may also be entitled to having their Stop highlighted upon the tour map so long as it is within a reasonable walkable vicinity of the elected tour. For hotel merchants, an embodiment may offer a separate service to permit users to book hotel rooms via a web link on the tour map for those hotels that are in the vicinity of the walking tours. The merchant partner in this instance may be charged a separate fee equal to a percentage of the total booking amount.

Certain embodiments of the invention may also allow for additional merchant revenue streams, including promoted tours sponsored by merchants or separate marketing partners, branded hikes, and custom private hikes for special events, conventions, pub crawls, college orientation, etc.

In some embodiments of the invention, a "white label" application may be provided allowing a merchant partner to provide a private branded version of the application. For example, a merchant partner, such as a hotel company, cruise line, or the like, may be able to provide a private-brand version of the application tailored to that merchant partner's business, such as focused on walking tours that start from one of the hotel's locations or walking tours for a cruise line's particular ports-of-call. As such the application as described herein may be modified for the particular location of the hotel company, cruise line, or the like such as by including those hikes provided by the hotel company, cruise line, or the like or that start in a particular location or geographical region defined by the hotel company, cruise line, or the like.

FIG. 5 is a block diagram illustrating the interactions with a merchant or Stop Owner according to an embodiment of the present invention. In some embodiments, a merchant can create an account and interact with the application by logging in 510. In some embodiments, the merchant may access their profile through an application interface on a mobile device or through a web site or portal. In some embodiments, the particular features available to the merchant may vary depending on whether the merchant is interacting through a mobile device application or a web portal. For example, the features provided in a mobile device application may provide information that is more relevant to the 'on the go" needs of a merchant whereas a web portal may provide more detailed information and analytics as well as additional features. Among other information, a merchant may have access to and can view user analytics 520 showing, for example, the number of users checking in to their location, the number of walking tours that the Stop is included on, the number of points received for checking in at the merchant's location, trending tips and comments, and rating for each hike. In some embodiments, a merchant's access to some features may be contingent on the merchant registering for certain features and paying a subscription fee, a check-in fee, or the like.

FIG. 6 is a block diagram illustrating the interaction between a merchant or Stop Owner according to an embodiment of the present invention. As described previously, the merchant may log into its account in order to interact with the application 610. After doing so, the merchant can select or create check-in offers to be made available to users on various walking tours 620. The merchant may have the ability to have the offer displayed in various ways through tour summary or detail screens 630, allowing the user to redeem the offers during check-ins. In some embodiments, the user can then check in at the location to create auditable evidence of a user arriving at the location. This can include, without limitation, GPS authentication, bar code scanning, QR code scanning, manual logging by the merchant of the user, WiFi authentication, NFC authentication, Bluetooth authentication, or any similar manner. Alternatively, in some embodiments, a unique authentication or promotional code may be entered, either by the user or the merchant, such as on the user's mobile device. In some embodiments, the user may receive a voucher or code, such as upon checking in at the Stop, which can be displayed to the merchant in order to redeem that offer. In some embodiments, the merchant may manage check-in for offers and/or redemption of offers through the Merchant Portal.

The information collected from the user interactions with the tour may enable the merchant partner to anticipate user arrivals with a reasonable degree of certainty. This has several advantages for the merchant partner, including "right sizing" the number samples or promoted items, preparing food or drink orders in anticipation and assuring proper staffing as needed.

FIG. 7 is a block diagram illustrating interactions among merchants, users, and the application according to one embodiment of the present invention. Again, the merchant can log into its account 710. The merchant can then choose to send offers to specific users 720, for example to those users who have saved the merchant location (Stop) into their saved places in the user's profile. The user may then receive the offer 730, which may, for example, be displayed under the location name in the user's saved places list. The user can select the offer, for example by clicking/pushing a button, which may cause the application to map a direct route to the merchant location 740. Additionally, in some embodiments, the merchant may receive a notification that the user is on the way to the merchant's location. Finally, the user may arrive of the location and create auditable evidence thereof 750, such as by checking in at the merchant location and receiving a voucher or code for redemption of the offer.

FIG. 8 is an example block diagram of another embodiment of the present invention wherein a user interacts with the application to take a tour. For example, the user begins interaction by opening the application 110, or by other means of interacting with a computer application, including through a web based portal. Once the application is open, the user may choose to forgo logging in and continue through a limited user experience as a guest. Without logging in, the user may be exposed only to limited functionalities of the entire application, for example the user may only be able to take a walking tour 820, such as by selecting the "Start Hiking" button illustrated in FIG. 12. After indicating a desire to take a walking tour, the user may be presented with a list of available tours and with various options to select or filter specific tours based on various criteria 830, such as distance to start, rating, tags, or other user-determined search terms. For example, the user may sort or search for tours by categories such as Most Popular, Nearby, or Featured, as well as searching by tour features, tags, keywords, or the like.

The user may select a tour and review 840 the details of the tour, including the distance traveled, information regarding Stops, number of Stops, type of Stops, recommendations or comments for each Stop, and deals or offers for each Stop that can be redeemed by checking in at the location. In some embodiments, the user may also be able to view on overview map of the tour which may, for example, display the route, the various Stops, and other tour details. In some embodiments, the user may not be able to check-in or redeem any deals or offers provided at a Stop unless the user is logged in, and the user may be provided with a prompt to log in to access these features.

Once the user has determined the route or hike that the user wants to take, that tour may be selected and activated 850. In some embodiments, if the user is not currently at the start point of the tour, the user may be directed to the starting point, where the user may start the tour. Upon starting the tour, in some embodiments, the user may be provided with a detailed map that follows the designed route and providing the designated stops, tour photos, comments and tips, or the like. In some embodiments, the user may be able to take photos of their route, experiences, and locations which may be stored on the mobile device and associated with the walking tour, however, the user may not be able to upload, post, or share the photos unless the user logs in to access the additional features.

As the user progresses physically along the tour, the user will arrive at various locations and/or Stops 860, however the users may not check in to the Stops as they progress along the tour. In some embodiments, the user may also view recommendations, tips, commentary, and/or photos, and the like, provided for the Stop. In some embodiments, a user may be prompted to login or create an account to access additional features after arriving at a Stop. For example, the user may be prompted to log in or create an account to check-in, rate or comment on a Stop, redeem deals or offers provided at a Stop, take and save/upload photos, save the Stop to a list of saved or favorite places, or the like.

The user may continue and traverse the entire mapped route 870 and arriving at each Stop along the route, however the user may be unable to check in at any of the Stops. After the last Stop on the route, the user may be prompted to log in or create an account to access additional features, such as rating the hike, uploading hike details and/or photographs taken during the tour to a profile or a social network, following the creator of the hike, and/or being notified of other tours that are available.

FIG. 9 is an example block diagram of another embodiment of the present invention wherein a user creates a tour. In some embodiments, a user may be provided with the ability to "map their day/night" to create a tour. Once again, the user opens the application 910 and logs in to interact with its functionalities.

In this example, the user indicates that he wants to "map my day/afternoon/night" 920. The user may begin moving or participating in the activities to be mapped as a tour, such as beginning to walk 930. As the user moves, the application tracks the user's path and records the route taken 940. The device being used may use various location technologies to log the user's location and path, for example via GPS or location-based WiFi. Along the way, the user may make a stop and if the user remains at that stop for a period of time, the stop may be logged as a possible stop for the tour 950. For example, a threshold may be defined to indicate when a stop should be logged as a possible stop, such as when a user remains at a location for at least ten minutes. In some embodiments, the user may create a tag or take a photo at any time while continuing to record their night 960.

At the end of the activity for the day/night, the user may indicate that the mapping is complete and the user may be presented with a list of the possible stops, the tags created, and the photos taken, such as in a sequential order 970. The user may edit the mapped tour and save it for other users to review or use 980. In some embodiments, a user may be able to remove one or more of the logged stops, such as by swiping on a touchscreen interface of the device. A user may be able to modify a logged stop, such as if the location was miscalculated. For example, the user may be presented with a list of locations near the logged stop to select the correct location. In some embodiments, the user may add details to the logged stops, such as adding tips, recommendations, commentary, or the like. Once the user has finished editing the tour, the user may save or upload the tour to be shared with other users. In some embodiments, statistics or other details may be generated for the tour, such as distance, time duration, or the like. In some embodiments, the user may be able to publish some of the tour information to a social network, such as an indication the user created the tour or photos taken during the tour.

FIG. 10 is an example block diagram of another embodiment of the present invention wherein a user creates a walking tour. In some embodiments, to begin creating a tour the user may open a website or web portal associated with the application and log in 1010.

In some embodiments, the user may indicate that he wants to make a new walking tour 1020. The user may enter a start point for the tour 1030, such as by entering an address, searching for a location, or the like. In some embodiments, the user may create entries for recommendations, tips, commentary, or photos for the start point.

The user may add subsequent stops along the tour 1040, such as by entering an address, searching for a location, or the like, and may create entries for recommendations, tips, commentary, or photos for the stops. The user may indicate a final stop along the tour 1050, such as by entering an address, searching for a location, or the like, and may create entries for recommendations, tips, commentary, or photos for the stop.

The user may indicate the tour is complete 1060, such as by pushing a finish button, for example. The user may be prompted to provide details regarding the tour, such as a name for the tour, information, tags, or commentary for the tour, and to select a category for the tour. The tour may then be saved. In some embodiments, the user may be able to publish some of the tour information to a social network. The new walking tour may then be available for sharing with other users 1070.

Referring to FIG. 11, an apparatus 1100 is provided for using, creating, and/or reviewing information about walking tours in accordance with an example embodiment and may include or otherwise be in communication with one or more of a processor 1102, a memory 1104, a user interface 1106, and a communication interface 1108.

It should also be noted that while FIG. 11 illustrates one example of a configuration of an apparatus 1100 for using, creating, and/or reviewing information about walking tours, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor (and/or co-processors or any other processing circuitry assisting or otherwise associated with the processor) may be in communication with the memory 1104 via a bus for passing information among components of the apparatus. The memory device 1104 may include, for example, a non-transitory memory, such as one or more volatile and/or non-volatile memories. The memory 1104 may be configured to store information, data, content, applications, instructions, or the like for enabling the apparatus to carry out various functions in accordance with an example embodiment of the present invention. For example, the memory 1104 could be configured to buffer input data for processing by the processor 1102. Additionally or alternatively, the memory 1104 could be configured to store instructions for execution by the processor.

In an example embodiment, the processor 1102 may be configured to execute instructions stored in the memory 1104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC (application specific integrated circuit) or FPGA (field programmable gate array), or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 1100 may include a user interface 106 that may, in turn, be in communication with the processor 1102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The apparatus 1100 may include a communication interface 1108 which may be any means such as a device or circuitry embodied in either hardware or a combination of hardware and software that is configured to receive and/or transmit data from/to a network and/or any other device or module in communication with the apparatus 1100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1102, discussed above with reference to FIG. 11, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 1104) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating a tour on a mobile device, the method comprising:
   receiving an indication to generate the tour using the mobile device, wherein the tour is a user-accessible and downloadable set of temporally sequential GPS coordinates collected from the mobile device in real-time as the mobile device traverses a real-world environment, comprising:
   at least one GPS coordinate associated to the tour as a starting point,
   a first subset of GPS coordinates identified as route information indicating a route traversed by the mobile device in the real world environment and configured to enable derivation of a distance of the tour, and
   a second subset of GPS coordinates identified as stop information, wherein the stop information is associated with stop content, and wherein the stop content is configured to enable derivation of searchable tags and searchable keywords;
   obtaining a real-time GPS coordinate of the mobile device and associating the real-time GPS coordinate as the starting point;
   capturing one or more additional GPS coordinates of the mobile device as it progresses through the generation of the tour;
   associating the one or more additional GPS coordinates in a sequence as route information of the tour;
   designating the one or more additional GPS coordinates as the first subset of GPS coordinates;
   determining one or more subsets of GPS coordinates, wherein each of the one or more subsets of GPS coordinates comprises one or more GPS coordinates co-located within a pre-defined range, and wherein the one or more subsets of GPS coordinates indicate one or more candidate stops;
   determining, for each of the one or more candidate stops, that the one or more GPS coordinates co-located within the pre-defined range stayed within the pre-defined range for a duration of time exceeding a predefined threshold;
   associating each of the one or more candidate stops in which the determination was made that the one or more GPS coordinates co-located within the pre-defined range stayed within the predefined range for the duration of time exceeding the predefined threshold as one or more stops on the tour;
   capturing data associated with the one or more stops, wherein the data includes a current location of the mobile device when an indication of the one or more stops is received and one or more of: tips, recommendations, commentary, ratings, and images associated with the location of the mobile device when the indication of the one or more stops is received;
   receiving an indication that the tour is complete, wherein the tour is configured to be stored or distributed via one or more social networks;
   storing the tour by uploading the tour by the mobile device to a remote storage location, the stored tour comprising the captured data associated with the one or more stops and the captured route and location information; and
   transmitting a merchant interface to a merchant device, wherein the merchant interface is configured to, when engaged by a merchant:
   determine that the tour comprises a location of the merchant as a stop;
   display tracking of a user on the tour;
   display a user profile of the user on the tour, wherein the user profile comprises information indicating whether the user has saved the location of the merchant in the user profile;
   determine that the user has saved the location of the merchant in the user profile;
   transmit a deal offer to a mobile device of the user on the tour; and display a notification indicating that the user on the tour is approaching the location of the merchant.

2. A method according to claim 1, wherein the tour is created by a user of an application and shared with other users of the application.

3. A method according to claim 1, further comprising:
receiving one or more of: tips, recommendations, commentary, ratings, and images; and
linking the received one or more tips, recommendations, commentary, ratings, and images to a stop on the tour route.

4. A method according to claim 1, further comprising:
generating stop information, wherein the stop information is generated from one or more data source providers based on at least one of location data associated with the stop, recommendations, commentary, ratings, and images.

5. A method according to claim 1, wherein storing the completed tour further comprises providing the completed tour to one or more social networks.

6. An apparatus for generating a tour comprising at least one processor and at least one memory including computer program instructions, the at least one memory and the computer program instructions configured to, with the at least one processor, cause the apparatus at least to:
receive an indication to generate the tour using a mobile device, wherein the tour is a user-accessible and downloadable set of temporally sequential GPS coordinates collected from a the mobile device in real-time as the mobile device traverses a real-world environment, comprising:
at least one GPS coordinate associated to the tour as a starting point,
a first subset of GPS coordinates identified as route information indicating a route traversed by the mobile device in the real world environment and configured to enable derivation of a distance of the tour, and
a second subset of GPS coordinates identified as stop information, wherein the stop information is associated with stop content, and wherein the stop content is configured to enable derivation of searchable tags and searchable keywords;
obtain a real-time GPS coordinate of the mobile device and associating the real-time GPS coordinate as the starting point;
capture one or more additional GPS coordinates of the mobile device as it progresses through the generation of the tour;
associate the one or more additional GPS coordinates in a sequence as route information of the tour;
designate the one or more additional GPS coordinates as the first subset of GPS coordinates;
determine one or more subsets of GPS coordinates, wherein each of the one or more subsets of GPS coordinates comprises one or more GPS coordinates co-located within a pre-defined range, and wherein the one or more subsets of GPS coordinates indicate one or more candidate stops;
determine, for each of the one or more candidate stops, that the one or more GPS coordinates co-located within the pre-defined range stayed within the pre-defined range for a duration of time exceeding a predefined threshold;
associate each of the one or more candidate stops in which the determination was made that the one or more GPS coordinates co-located within the pre-defined range stayed within the predefined range for the duration of time exceeding the predefined threshold as one or more stops on the tour;
capture data associated with the one or more stops, wherein the data includes a current location of the mobile device when an indication of the one or more stops is received and one or more of: tips, recommendations, commentary, ratings, and images associated with the location of the mobile device when the indication of the one or more stops is received;
receive an indication that the tour is complete, wherein the tour is configured to be stored or distributed via one or more social networks;
store the tour by uploading the tour by the mobile device to a remote storage location, the stored tour comprising the captured data associated with the one or more stops and the captured route and location information; and
transmit a merchant interface to a merchant device, wherein the merchant interface is configured to, when engaged by a merchant:
determine that the tour comprises a location of the merchant as a stop;
display tracking of a user on the tour;
display a user profile of the user on the tour, wherein the user profile comprises information indicating whether the user has saved the location of the merchant in the user profile;
determine that the user has saved the location of the merchant in the user profile;
transmit a deal offer to a mobile device of the user on the tour; and
display a notification indicating that the user on the tour is approaching the location of the merchant.

7. An apparatus according to claim 6, wherein the tour is created by a user of an application and shared with other users of the application.

8. An apparatus according to claim 6, further comprising the at least one memory and the computer program instructions configured to, with the at least one processor, cause the apparatus at least to:
receive one or more of: tips, recommendations, commentary, ratings, and images; and
link the received one or more tips, recommendations, commentary, ratings, and images to a stop on the tour route.

9. An apparatus according to claim 6, further comprising the at least one memory and the computer program instructions configured to, with the at least one processor, cause the apparatus at least to:
generate stop information, wherein the stop information is generated from one or more data source providers based on at least one of location data associated with the stop, recommendations, commentary, ratings, and images.

10. An apparatus according to claim 6, wherein storing the completed tour further comprises providing the completed tour to one or more social networks.

* * * * *

UNITED STATES PATENT AND TRADEMARK OFFICE
CERTIFICATE OF CORRECTION

PATENT NO. : 10,866,100 B2  
APPLICATION NO. : 13/839007  
DATED : December 15, 2020  
INVENTOR(S) : Kuri et al.

Page 1 of 1

It is certified that error appears in the above-identified patent and that said Letters Patent is hereby corrected as shown below:

On the Title Page

Item (71) Applicant: "Kamino Labs, Inc., San Diego, CA (US)" should read --Kamino Labs, Inc., Houston, TX (US)--.

Item (72) Inventors: "Jorge Carlos Kuri, Houston, TX (US)" should read --Jorge Carlos Kuri, New York, NY (US)--.

In the Claims

Column 19,
Line 29, Claim 6: "a the mobile device" should read --the mobile device--.

Signed and Sealed this  
Fifth Day of July, 2022

Katherine Kelly Vidal  
*Director of the United States Patent and Trademark Office*